Patented May 3, 1949

2,468,920

UNITED STATES PATENT OFFICE 2,468,920

HAMMERED METAL FINISH COMPOSITIONS

Arthur R. Brown, Old Bridge, and Robert T. Hucks, South River, N. J., and Charles W. Johnson, Flint, Mich., assignors to E. I. du Pont de Nemours & Company, Wilmington, Del., a corporation of Delaware No Drawing. Application January 12, 1946, Serial No. 640,990

4 Claims. (Cl. 106—171)

This invention relates to coating compositions which, when applied to suitable substrates such as steel, paper, wood, etc., produce novelty finishes of the hammered metal type. More particularly it relates to quick-drying compositions which can be applied alone avoiding use of a number of different finishing materials but providing desirable hammered metal effects.

The conventional method used in the decoration of metallic surfaces to produce a hammered effect involves hammering the exposed surface with a suitable tool. This method is arduous and expensive. Machine hammering has also been used but this method, as well as handwork, has disadvantages in that the desired effect can be achieved only on metallic surfaces of sufficient thickness to withstand the hammering. It has, therefore, been desirable to provide compositions and methods of application which simulate the popular hammered metal effect.

Much work has been done by experimenters and technicians in devising ways and means of simulating hammered metal. It has been proposed that a resinous composition containing aluminum flake and pigment be spattered on a suitable substrate. A further procedure involves application of a resinous composition containing aluminum flake and pigment and then before the film sets the surface is spattered with a suitable solvent mixture. Other methods depend for their efficacy on the use of small amounts of raw rubber. Still further compositions are based on the use of granular pigments in conjunction with aluminum flake. It has also been proposed to use compositions containing relatively large amounts of low viscosity cellulose nitrate.

The prior art methods and compositions have serious defects in that they are in most cases slow drying and in all cases application is extremely tedious, given patterns are difficult to reproduce, and application involves the use of considerable skill by the operator. They are, therefore, of limited value in modern production line factories where articles such as automobile instrument panels and garnish moulding are being produced at a rapid rate.

The principal object of this invention is to provide coating compositions which, when applied to a variety of suitable substrates, return simulated hammered metal effects of decorative value.

Another object of this invention is to provide coating compositions which dry rapidly to simulate hammered metal, are easily reproducible and are, therefore, adaptable to production line methods of application.

A further object of this invention is to provide coating compositions which, when applied alone, give excellent simulations of hammered metal.

Other objects will readily appear as the description of the invention proceeds.

The objects of this invention are accomplished by providing lacquer type compositions which, when applied, yield the desired hammered metal effect from one coating material. Such compositions comprise combinations of a relatively large amount of cellulose nitrate of low viscosity, pigment and/or coloring matter, aluminum flake and a small amount of "dynamite" type cellulose nitrate, preferably one part of the latter to about 28 parts of low viscosity cellulose nitrate.

The improved simulated hammered metal compositions are illustrated by the following examples which have been successfully used. It is not intended, however, that the scope of this invention be limited except insofar as defined in the appended claims. The parts given are in terms of percentage by weight.

EXAMPLE I

Base A (conventional metal lacquer)

| | Per Cent |
|---|---|
| Cellulose nitrate | 5.2 |
| 2B denatured alcohol | 2.8 |
| Ethyl acetate | 12.2 |
| Butyl acetate | 15.0 |
| Butyl alcohol | 9.6 |
| Cellosolve | 4.1 |
| Special naphtha (B. P. 138–200° C.) | 3.5 |
| Petroleum naphtha (B. P. 88–131° C.) | 15.1 |
| Dibutyl phthalate | 1.5 |
| Alkyd resin | 31.0 |
| | 100.0 |

Base B ("dynamite" cellulose nitrate base solution)

| | Per Cent |
|---|---|
| "Dynamite" type cellulose nitrate | 1.5 |
| 2B denatured alcohol | .8 |
| Petroleum naphtha (B. P. 88–131° C.) | 4.0 |
| Diacetone alcohol | 46.4 |
| Butyl acetate | 47.3 |
| | 100.0 |

In preparing this base, it is advisable to moisten the cellulose nitrate with the petroleum naphtha and add in a mixer to the diacetone alcohol. The butyl acetate is then added and mixing completed.

Base C (aluminum tinting base)

| | Per cent |
|---|---|
| Cellulose nitrate | 16.4 |
| Ester gum | 4.1 |
| Blown castor oil | 9.9 |
| Aluminum paste | 7.5 |
| Citric acid | 0.3 |
| 2B denatured alcohol | 8.4 |
| Butyl alcohol | 2.2 |
| Butyl acetate | 10.6 |
| Methyl ethyl ketone | 20.0 |
| High solvency petroleum naphtha (B. P. 95–140° C.) | 20.6 |
| | 100.0 |

Silvered hammered metal

| | Per cent |
|---|---|
| 1st portion: | |
| Base B | [1] 20 |
| Base C | [1] 41 |
| 2nd portion: | |
| Base A | [2] 20 |
| Processed linseed oil | [2] 15 |
| Black lacquer | [2] 4 |
| | 100 |

[1] Mix for 10 minutes.
[2] Add ingredients directly to 1st portion and mix until uniform.

The cellulose nitrate used in Bases A and C had a viscosity characteristic of 12 seconds as determined in accordance with the procedure outlined in A. S. T. M. specifications D–301–33, Formula C.

The "dynamite" type cellulose nitrate employed in Base B was manufactured according to methods well known in the art. In one method cotton linters previously subjected only to a very mild digestion at atmospheric pressure to remove oils and fats are nitrated at a temperature of 0–5° C. for a period of about 30 minutes with a nitrating acid mixture of which the following is typical:

| | Per cent |
|---|---|
| Nitric acid | 23.85 |
| Sulfuric acid | 56.91 |
| Nitrosyl sulfuric | 2.82 |
| Water | 16.42 |
| | 100.00 |

The nitrogen content of this type of cellulose nitrate is usually between about 12.15 and 12.35%. The product has an exceptionally high viscosity characteristic and ordinarily cannot be dissolved in volatile solvents and diluents in any considerable concentration. As an arbitrary (but necessary modification of the A. S. T. M. D–301–33) measure of the viscosity characteristic of this type of cellulose nitrate, a sample was dissolved in acetone in the proportion of 3% by weight. This is because a 12.2% solution as called for by the A. S. T. M. method could not be made. The viscosity of this solution determined in accordance with the modified falling ball method was 95.2 seconds. A similar determination on a heavy coating type cellulose nitrate, which had a viscosity characteristic of 1,090 seconds in Formula A of A. S. T. M. specifications D–301–33, had a viscosity of only 0.3 second for a 3% solution in acetone. Another test was made on a similar high viscosity nitrocellulose of a viscosity of 4,670 seconds (A. S. T. M. Formula A) and a value of 0.5 second was obtained. These figures are directly comparable and illustrate the extremely high viscosity characteristic of the dynamite type cellulose nitrate as compared to a so-called high viscosity dope type cellulose nitrate commonly employed for coating purposes.

The alkyd resin solution used in Base A consisted of 50 parts of toluene and 50 parts of a synthetic resin of approximately the following composition:

| | Per cent |
|---|---|
| Glyceryl phthalate | 64 |
| Cottonseed oil fatty acids | 36 |
| | 100 |

This resin may be conveniently prepared according to procedures well known to those skilled in the art.

The aluminum paste used is a commonly available paste containing approximately 66% metal flake in a liquid petroleum hydrocarbon, and may be made in accordance with Hall 2,002,891.

The processed oil used in this example was an oxidized linseed oil having an iodine number of 110–115 cg. of iodine per gram and a saponification number of 200–230 mg. of KOH per gram of oil and was prepared by blowing the oil at moderately elevated temperatures (not over about 250° F.) for extended periods of time (for example, about 10 days) and cut in denatured ethyl alcohol in the proportion of 85 parts by weight of oil to 15 parts by weight of denatured alcohol.

The black lacquer used in the 2nd portion was typical of such products used in auto body finishing. It contained 14% of low viscosity cellulose nitrate and a high grade (small particle size) carbon black together with suitable resin, plasticizer, and solvents. It contained 38% solids.

The finished composition shown above, when applied by standard spraying procedures to a suitable substrate such as a steel plate, resulted in a hammered silver finish of uniform pattern and glossy appearance.

Example II

Base D (pigmented tinting enamel)

| | Per cent |
|---|---|
| Cellulose nitrate | 17.10 |
| Ester gum | 4.30 |
| Dibutyl phthalate | 5.30 |
| Blown castor oil | 3.50 |
| Lead chromate orange | 7.38 |
| Synthetic iron oxide | .88 |
| Synthetic ferrite yellow | 3.52 |
| Carbon black (high grade) | .22 |
| 2B denatured alcohol | 8.00 |
| Butyl alcohol | 4.20 |
| Butyl acetate | 14.00 |
| Methyl ethyl ketone | 20.00 |
| High solvency petroleum naphtha (B. P. 95–140° C.) | 11.60 |
| | 100.00 |

The pigments shown in Base D are preferably dispersed on a two-roller mill in a colloid containing the alcohol wet cellulose nitrate and the dibutyl phthalate.

The cellulose nitrate used in Base D had a viscosity characteristic of 12 seconds as determined in accordance with the procedure outlined in A. S. T. M. specifications D–301–33, Formula C.

Bronze hammered metal

| | Per cent |
|---|---|
| 1st portion: | |
| Base B (of Example I) | 20 |
| Base C (of Example I) | 20 |

2nd portion:
Base A (of Example I) _____ 20
Base D (of Example II) _____ 25
Processed linseed oil _____ 15
————
100

The ingredients are mixed as described in Example I.

The finished composition shown above, when applied by standard spraying procedures to a suitable surface, produces a hammered bronze finish of great beauty.

EXAMPLE III

Base E (pigmented tinting enamel)

| | Per cent |
|---|---|
| Cellulose nitrate | 15.50 |
| Ester gum | 3.90 |
| Dibutyl phthalate | 5.60 |
| Blown castor oil | 3.70 |
| Cadmium red light | 9.27 |
| Lead chromate orange | 1.53 |
| Carbon black (high grade) | .20 |
| 2B denatured alcohol | 6.20 |
| Butyl alcohol | 4.00 |
| Butyl acetate | 22.80 |
| Methyl ethyl ketone | 17.20 |
| High solvency petroleum naphtha (B. P. 95–140° C.) | 10.10 |
| | 100.00 |

The pigments shown in Base E may be dispersed by a conventional method such as ball milling in the resin and some of the liquid constituents.

The cellulose nitrate used in Base E had a viscosity characteristic of 12 seconds as determined in accordance with the procedure outlined in A. S. T. M. specifications D–301–33, Formula C.

Copper hammered metal

1st portion: Per cent
Base B (of Example I) _____ 20
Base C (of Example I) _____ 20
2d portion:
Base A (of Example I) _____ 20
Base E (of Example III) _____ 25
Processed linseed oil _____ 15
————
100

The ingredients are mixed as described in Example I.

On application of the composition given in this example by standard spraying procedures, a hammered copper finish of considerable decorative value was obtained on the object.

It is pointed out that in the three examples given above, use has been made of several "bases" in the preparation of the final compositions of the invention. This in large part is a matter of convenience and the various ingredients may be put together by other methods well known to those skilled in the art. However, it must be realized that "dynamite" type cellulose nitrate is difficultly soluble even in ketone and ester solvents and must be handled in a suitable manner. As a matter of fact, it is believed that the desirable hammered metal effects are a direct result of the poor solubility characteristics of this type of cellulose nitrate. The metal flake in combination with the extremely high viscosity of the cellulose nitrate together with small amounts of coloring pigments gives the hammered effect simulating the various metals and shades thereof.

While any reasonably rich lacquer thinner may be used to reduce the finished compositions to spraying consistency, the following combination of solvents by weight has been found to be entirely satisfactory:

| | Per cent |
|---|---|
| Butyl acetate | 30.0 |
| Methyl ethyl ketone | 5.0 |
| Butyl alcohol | 17.0 |
| Isopropyl alcohol | 5.0 |
| Pentacetate | 5.0 |
| Special naphtha (B. P. 138–200° C.) | 13.0 |
| High solvency petroleum naphtha (B. P. 95–140° C.) | 14.0 |
| Petroleum naphtha (B. P. 88–131° C.) | 11.0 |
| | 100.0 |

The present silver, bronze, and copper finishes were reduced with the above thinner to viscosity of between 50 and 80 centipoises which has been found to be satisfactory consistency for spraying.

As indicated, the compositions of this invention are adapted to application by spraying. Actual spraying procedures can be readily arrived at by anyone skilled in the art. It has been found, however, that equipment offered for sale by the DeVilbiss Company is adequate. Their type MBC spray gun with a #76 or #765 cap and an E tip gives good results. With this equipment liquid pressures of from 8 to 20 pounds per square inch and air pressures at the gun of from 50 to 70 pounds per square inch gave excellent effects.

Application of the new compositions requires no special technique and simple variations will occur to anyone versed in the art of spraying. It is considered, however, that such minor variations are well within the scope of the invention.

The coating composition of this invention may be applied to any surface desired such as steel, aluminum, wood or paper. They may be applied directly to such substrates without preliminary priming or surfacing and when so used on rough metal or other surfaces they tend to obscure defects. This is quite important since it obviates the expense of tedious surface preparation, puttying, glazing, etc. The compositions are, however, adaptable to application over suitable primers, glazes, and surfacers. These base coatings, however, are not considered a part of this invention and play no part except to improve adhesion to the substrate and fill up large defects that might be objectionable in the finished surface.

Aluminum flake is shown in the examples enumerated. Other metallic flakes such as nickel, powders such as bronze (alloys of copper and zinc) and copper powder are also useful in varying the color and pattern. The coarser grades of these metallic pigments are more desirable because of their greater brilliance.

The amount of aluminum flake or other metallic pigment may be varied through wide limits as shown in the examples, however, the amount to be used is easily determined by one skilled in the art of preparing novelty finishes.

The color of the final finish may be varied by the skillful use of pigments or dyes. The preferred coloring matters, however, are pigments or pigment dyestuffs because of their superior fastness to light on exposure under outdoor or semi-outdoor conditions. It is also important that pigments used be finely dispersed to as small particle size as is economically possible. The amount of pigment or other coloring matter may be varied, but in order to obtain the effect of "depth" of finish, these materials should be used only for the coloring effect desired.

The simulated hammered metal finishes of this invention may be buffed and polished by hand or machine to considerable lustre and beauty and need no further protection. If desired, however, to obtain greater "depth" and smoothness of film, clear top coat transparent lacquers may be applied, and if a high quality finish is necessary, the finish may then be buffed and polished by hand or machine.

The "dynamite" type cellulose nitrate is most conveniently incorporated into the composition of the invention in the form of a "base" as disclosed above. The preferred amount of this ingredient is about .8% calculated on the total solids of the finished composition. The hammered metal effect may be varied by the amount of "dynamite" type cellulose nitrate present in the composition. Too little of this ingredient results in poor effects, on the other hand, too much returns high viscosity and, consequently, excessive thinner is necessary to reduce to spraying consistency. The compositions given require about 100% reduction with nitrocellulose lacquer thinner to obtain satisfactory spraying viscosity. The preferred range of "dynamite" type cellulose nitrate is between .5% and 1.5% calculated on the total solids of the unreduced compositions.

The amount of aluminum flake required is goverened to a great extent by the kind of metal it is desired to simulate. Generally, lower amounts of aluminum are used when considerable coloring matter is required to match a given metal. It has been found that the optimum amount of aluminum flake is between 1.5% and 7.5% calculated on the total solids of the final composition.

The coating compositions disclosed in this specification are useful in decorating and protecting the surface of a wide variety of articles. They are adaptable to metal both as decorative coatings and for hiding rough or imperfect surfaces. They may also be used over wood, paper, or practically any surface it is desired to decorate or protect. They are particularly adaptable to automobile instrument panels and garnish mouldings, radio cabinets, caskets of either metal or wood, business machines, metal cabinets, toys, etc.

The present coating compositions represent a distinct advance in the art in that they are quick drying, easy to apply, and provide means of obtaining valuable hammered metal effects with one material.

To those skilled in the art, it will be apparent that many widely different modifications of this invention may be made without departing from the spirit and scope thereof and, therefore, it is not intended to be limited except as indicated in the appended claims.

We claim:

1. A coating composition comprising about 28 parts of cellulose nitrate having a viscosity characteristic of not over 200 centipoises to about 1 part of dynamite type cellulose nitrate, and about 1.5–7.5% of finely divided metal powder based on the weight of the total solids in the composition.

2. The composition of claim 1 in which the dynamite type cellulose nitrate is present in amount of about .8% based on the weight of the total solids.

3. The composition of claim 1 in which the metal particles are aluminum.

4. The composition of claim 1 in which a pigment is present in addition to the metal powder.

ARTHUR R. BROWN.
ROBERT T. HUCKS.
CHARLES W. JOHNSON.

REFERENCES CITED

The following references are of record in the file of this patent:

UNITED STATES PATENTS

| Number | Name | Date |
| --- | --- | --- |
| 2,310,867 | Pitman | Feb. 9, 1943 |
| 2,326,001 | Ariotte | Aug. 3, 1943 |